Patented May 23, 1944

2,349,348

UNITED STATES PATENT OFFICE 2,349,348

DIHYDROXY-ACETONE-DIETHER AND ITS MANUFACTURE

Adolf Grün, Basel, Switzerland, assignor to the firm J. R. Geigy A. G., Basel, Switzerland No Drawing. Application December 9, 1940, Serial No. 369,356. In Switzerland December 29, 1939

5 Claims. (Cl. 260—590)

It has been found that unsymmetrical dihydroxy acetone diethers containing at least one radical and preferably two different radicals selected from the group consisting of olefinic and branched (if desired also brominated) aliphatic radicals with at most five carbon atoms and aromatic radicals of the benzene series which are unsubstituted or substituted in o-position by a methoxy or ethoxy group possess valuable therapeutic properties. In the cases where only one of both hydroxyl groups of the dihydroxy acetone is substituted by one of the special ether radicals above defined, the second hydroxyl group can be etherified by any usual ether radical.

It is known to produce the $\alpha,\gamma$-diethoxy-acetone from $\alpha,\gamma$-diethoxy-aceto-acetic ester by the so-called ketonic splitting [Bull. (3) 1, 12, see also Ann. 269, 30] as well as by distillation of the calcium salts of the ethoxy-acetic acid. Symmetrical dialkoxy-acetones from the dimethyl compound up to the diamyl compounds have been made by oxidation of the corresponding sym-dialkoxy-propanols. This method consists in oxidising the glycerol-$\alpha:\gamma$-dialkyl ethers with hexavalent chromium salts. It has now been found that this method is also technically applicable and that according to this process also mixed types with two different alkyls, for example compounds with alkyl and isoalkyl, alkyl and aryl, alkyl or halogen alkyl radical can be produced by synthesis. Furthermore, this oxidation method can also be applied to dialkylines with unsaturated groups consisting for example of alkenyls, cyclo-olefinic and aromatic radicals and so on, in any suitable combination with an alkyl-, isoalkyl- and aryl-compound. Under like conditions as the 1,3-dialkylines, one can also oxidise their starting or intermediate products, i. e. the glycerol halogenhydride ethers, to the corresponding ketones and in these, under certain conditions also in the 1:3-dihalogen-acetones, one can exchange the halogen atoms against alkyloxy groups.

The invention is illustrated, but no limited, by the following examples, the parts being by weight where nothing other is said.

EXAMPLE 1

1:3-diisobutoxy-propanone-2

20 parts of 1:3-di-isobutoxy-propanol-2 are dissolved in at least the five fold quantity of glacial acetic acid, then 6.5 parts of chromic anhydride dissolved in the necessary quantity of acetic acid are added, while stirring, drop by drop thereto first at 50° C. and subsequently at a some higher temperature and stirring is continued until the perchromic acid reaction with hydrogen peroxide and ether becomes negative. The glacial acetic acid is distilled off in vacuo at about 30° C., the residue is dissolved in water, neutralised by means of bicarbonate, the neutral oxidation product, a colorless nearly odorless liquid, remaining in undissolved condition is separated and, if necessary, taken up in a solvent, dried and purified by distillation. The compound boils at 131–134° C. at 13 mm. pressure. As an acetone derivative it shows beside other properties the faculty of adding chloroform under formation of 1:2-di-isobutoxy-3:3:3-trichloro-tertiary-butyl-alcohol which by means af alkali gives the corresponding isovalericacid derivative.

EXAMPLE 2

1-ethoxy-3-isobutoxy-propanol-2

1-ethoxy-3-isobutoxy-propanol-2, made from 1-ethoxy-3-chloropropanol-2 by causing sodium isobutylate to react therewith, is treated according to Example 1. Thus the 1-ethoxy-3-isobutoxy-propanone-2 is obtained in form of a colorless and odorless neutral liquid, B. P. at 17 mm. 106–108° C.

The same compound is also produced by exchanging the order of succession of ether formation and oxidation. The ethoxychloropropanol is converted, when oxidising it under the conditions indicated in Example 1, into the 1-ethoxy-3-chloropropanone-2, B. P. at 13 mm. 75–80° C., which is characterised as a ketone by forming a 2:4-dinitrophenyl-hydrazone. From the ketone the chlorine atome is exchanged against the isobutoxy group by reacting with isobutylate, thus giving the 1-ethoxy-3-isobutoxy-propanone-2. 1-methoxy-, 1-propyloxy- or 1-amyloxy-3-isobutoxy-propanol-2 can be oxidised in quite the same manner.

EXAMPLE 3

1-ethoxy-3-phenoxy-propanone-2

A solution of 64 parts of concentrated sulfuric acid and 36 parts of water is allowed, while vigorously stirring, to drop into the mixture of 100 parts of 1-ethoxy-3-phenoxy-propanol-2 and 52 parts of sodium bichromate (of 99 per cent strength) in 92 parts of water, kept at a temperature of 20–23° C. The reaction is completed after 6 to 8 hours (reaction to chromic acid is negative). The raw product is separated from the aqueous solution, then freed by extracting with bicarbonate (if necessary after diluting with a solvent) for removing the acid by-products resulting in a small quantity, thereupon dried and distilled; B. P. at 13 mm. 151° C. In exactly the same manner there is obtained the corresponding methoxy-phenoxy compound.

EXAMPLE 4

1-isobutoxy-3-phenoxy-propanone-2

Pure 1-isobutoxy-3-phenoxy-propanol-2 of the boiling point of 165–166° C. at 13 mm. is oxidised by means of chromic anhydride according to the prescriptions of Example 1. The 1-isobutoxy-3-phenoxy-propanone-2 thus obtained forms a colorless and odorless liquid which does not differ from the ethyl-homologous apart from the higher boiling point (B. P. at 17 mm. 165° C.).

In the same manner the oxidation of 1-isopropyloxy-3-phenoxy-propanol-2, 1-isoamyloxy-3-phenoxy-propanol-2 and 1-cyclohexenyloxy-3-phenoxy-propanol-2 to 1-isopropyloxy-3-phenoxy-propanone 2- or 1-isoamyloxy-3-phenoxy-propanone-2, or to 1-cyclohexenyloxy-3-phenoxy-propanone-2 takes place.

Glycerol ethers containing radicals of the naphthalene series such as the α-, β-naphthyl- or the corresponding tetrahydronaphthyl radicals have, when oxidised, exactly the same behaviour.

Example 5

*1-ethoxy-3-(o-methoxy-phenoxy)-propanone-2*

From epiguaiacoline, made from guaiacol-potassium salt and epichlorhydrine, there is prepared by addition of alcohol the 1-ethoxy-3-(o-methoxy-phenoxy)-propanol-2, according to the indications mentioned in patent application No. ———, Case 328, Example 2). This compound is isolated by fractionating under a pressure of 17 mm. at 175–178° C.

107 parts of the said compound are intermixed, while vigourously stirring, with a solution of 52 parts of sodium bichromate and 92 parts of water, then 100 parts of sulfuric acid of 63 per cent strength are allowed to gradually flow into this mixture at about 20° C. and stirring is continued until no more reaction to chromic acid can be detected. Then the raw product is separated, washed with water, with bicarbonate solution and once more with water, dried and distilled. The 1-ethoxy-3-(o-methoxy-phenoxy)-propanone-2 thus obtained with a yield of 80 per cent constitutes a light-yellow oil boiling under a pressure of 13 mm. at 169–171° C.

Example 6

*1-β-bromopropenoxy-3-phenoxy-propanone-2*

1-bromallyloxy-3-phenoxy-propanol-2 (made by causing 1-phenoxy-2:3-dihydroxypropane, mono-sodium salt, to react with 2:3-dibromo-propene or from 1-allyloxy-3-phenoxy-propanol-2 by addition of bromine and splitting off of 1 molecule of hydrobromic acid from the dibromo-compound) is dissolved in about the sixfold volume of glacial acetic acid and cooled down to 5° C. The solution of 35 parts of chromic anhydride, 24 parts of water and 100 parts of glacial acetic acid, which is cooled down, is added to the said mixture while stirring and cooling with ice. After a standing for 24 to 90 hours at 0° C. the chromic acid is quantitatively consumed. The water and acetic acid are as well as possible removed in vacuo; the residue is made neutral to litmus by means of bicarbonate, then extracted with ether, whereupon the solution is evaporated (dried) and the 1-β-bromo-propenoxy-3-phenoxy-propanone-2 purified by distillation in high-vacuo.

If 1-ethoxy-3-bromopropenoxy-propanol, B. P. at 15 mm. 135–140° C., is oxidised as above described, there results with the same yield the 1-ethoxy-3-bromo-propenoxy-propanone, B. P. at 2 mm. 123–124° C.

By oxidising glycerol ethers containing instead of the propene radical that of the butene-3-ol-1, in the same manner as above mentioned, very similar compounds are generally obtained which only differ by the fact that they possess a somewhat higher boiling point.

Example 7

The solution from 31 parts of 1-propenoxy-3-phenoxypropanol (B. P. at 16 mm. 167–169° C.) in 180 parts of pure glacial acetic acid is cooled down to 0° to 5° C. and very slowly mixed, while stirring, with the solution from 15 parts of chromic anhydride in 10 parts of water and 50 parts of glacial acetic acid. The whole is allowed to stand at 0° C., until the chromic acid is completely reduced (test by means of hydrogen peroxide and ether should be negative). Then the glacial acetic acid and small quantities of the acid by-product of the oxidation are removed in the same manner as in the foregoing examples. Thus 26 parts of 1-propenoxy-3-phenoxy-propanone-2 are obtained in form of a feebly yellow liquid boiling under a pressure of 13 mm. at 151–152° C.

What I claim is:

1. An unsymmetrical dihydroxy-acetone diether of the following formula:

$$\begin{array}{c} CH_2.O.R_1 \\ | \\ C=O \\ | \\ CH_2.O.R \end{array}$$

wherein R represents a radical selected from the group consisting of isopropyl, isobutyl, isoamyl, bromo-propenyl, cyclohexenyl, phenyl and o-methoxyphenyl, and $R_1$ represents a member of the group consisting of ethyl and phenyl.

2. An unsymmetrical dihydroxy-acetone diether of the following formula:

$$\begin{array}{c} CH_2.O.C_2H_5 \\ | \\ C=O \\ | \\ CH_2.O.R \end{array}$$

wherein R represents a radical selected from the group consisting of isopropyl, isobutyl, isoamyl, bromo-propenyl, cyclohexenyl, phenyl and o-methoxyphenyl.

3. An unsymmetrical dihydroxy-acetone diether of the following formula:

$$\begin{array}{c} CH_2.O-C_6H_5 \\ | \\ C=O \\ | \\ CH_2.O.R \end{array}$$

wherein R represents a radical selected from the group consisting of isopropyl, isobutyl, isoamyl, bromo-propenyl, cyclohexenyl, phenyl and o-methoxyphenyl.

4. The dihydroxy-acetone diether of the formula:

$$\begin{array}{c} CH_2.O.C_2H_5 \\ | \\ C=O \\ | \qquad\qquad CH_3 \\ CH_2.O.C-CH_3 \\ \qquad\qquad | \\ \qquad\qquad CH_3 \end{array}$$

being a colorless and odorless, neutral liquid of boiling point 106–108° C. at 17 mm.

5. The dihydroxy-acetone diether of the formula:

$$\begin{array}{c} \qquad\qquad Br \\ \qquad\qquad | \\ CH_2.O.CH_2-C=CH_2 \\ | \\ C=O \\ | \\ CH_2.O-C_6H_5 \end{array}$$

being a colorless, neutral liquid of boiling point 173–175° C. at 3 mm.

ADOLF GRÜN.